(12) United States Patent
Wang et al.

(10) Patent No.: US 7,564,906 B2
(45) Date of Patent: Jul. 21, 2009

(54) OFDM TRANSCEIVER STRUCTURE WITH TIME-DOMAIN SCRAMBLING

(75) Inventors: Haifeng Wang, Oulu (FI); Jorma Lilleberg, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 633 days.

(21) Appl. No.: 10/781,041

(22) Filed: Feb. 17, 2004

(65) Prior Publication Data
US 2005/0180311 A1    Aug. 18, 2005

(51) Int. Cl.
*H04L 27/28* (2006.01)
(52) U.S. Cl. .................................. 375/260
(58) Field of Classification Search ............. 375/260; 370/208, 210, 343, 344, 480
See application file for complete search history.

(56) References Cited

U.S. PATENT DOCUMENTS

| 6,438,367 | B1 | 8/2002 | Crawford ............ 455/410 |
| 7,184,714 | B1 * | 2/2007 | Kutagulla et al. ....... 455/73 |
| 2002/0172147 | A1 * | 11/2002 | Matsumoto ........... 370/208 |

FOREIGN PATENT DOCUMENTS
EP    1130840 A2    2/2001

OTHER PUBLICATIONS

IEEE Communications Magazine, 0163-6804/90/0005-0005; J. Bingham; "Multicarrier Modulation for Data Transmission: An Idea Whose Time Has Come"; pp. 5-13; May 1990.

IEEE Journal on Selected Areas in Communications, 0733-8716/91/0800-0895; J. Chow et al.; "A Discrete Multitone Transceiver System for HDSL Applications"; pp. 895-908; Aug. 1991.

IEEE Communications Magazine, 0163-6804/94; W. Chen et al.; "Applicability of ADSL to Support Video Dial Tone in the Copper Loop"; pp. 102-109; May 1994.

IEEE Transactions on Broadcasting, 0018-9316/95; W. Zou et al.; "COFDM: An Overview"; pp. 1-8; Mar. 1995.

3GPP TR 25.892 VO.1.1 (Feb. 2003); "Feasibility Study for OFDM for UTRAN enhancement"; 2003.

3GPP TR 25.892 VO.0.2 (Nov. 2002); "Feasibility Study for OFDM for UTRAN enhancement"; 2002.

3GPP TSG-RAN-1 Meeting #32, R1-030523; "Benefits of Frequency Hopping for the OFDM DL"; pp. 1-4; May 19-23, 2003.

(Continued)

*Primary Examiner*—Betsy L Deppe
(74) *Attorney, Agent, or Firm*—Ware, Fressola, Van Der Sluys & Adolphson, LLP

(57) ABSTRACT

A method and transceiver for wireless multicarrier communications. At the transmitter side, conventional OFDM symbols, after inverse fast Fourier Transform, are scrambled in time domain and then guard-interval (GI) inserted, up-converted at the carrier frequency for transmission. At the receiver side, after GI removal and frequency domain channel equalization, the received signal is transformed into time-domain by inverse fast Fourier Transform. The time-domain equalized signal is descrambled in time domain and then transformed back to the frequency domain before it is rate-matched, demodulated and decoded. This time-domain scrambling and descrambling method can be used in a wireless OFDM system such as WLAN, cellular OFDM, and MC-CDMA.

20 Claims, 4 Drawing Sheets

OTHER PUBLICATIONS

3GPP TSG-RAN WG1 Meeting #33, R1-030799; "Time-frequency mappings of OFDM units for full frequency reuse without resource planning"; pp. 1-4; Aug. 25-29, 2003.

IEEE Communications Letters, 1089-7798/03; K. Yang et al.; "Peak-to-Average Power Control in OFDM Using Standard Arrays of Linear Block Codes"; pp. 174-176; Apr. 2003.

IEEE 0-7803-7467-3/02; M. Tanno et al.; "Three-Step Fast Cell Search Algorithm Utilizing Common Pilot Channel for OFCDM Broadband Packet Wireless Access"; pp. 1575-1579; 2002.

IEEE 0-7803-7244-1/01; Y. Hanada et al.; "Three-Step Cell Search Algorithm for Broadband Multi-carrier CDMA Packet Wireless Access"; pp. G-32-G-37; 2001.

IEEE $7^{th}$ Int. Symp. on Spread-Spectrum Tech. & Appl., 0-7803-7627-7/02; P. Kim et al.; "An OFDM-CDMA Scheme Using Orthogonal Code Multiplexing and Its Parallel Interference Cancellation Receiver"; pp. 368-372; 2002.

F. Kowaleski; "OFDM Mit Scrambling"; Siemens Technik Report, Jahrgang 5 Nr 16, pp. 92-93; Apr. 2002.

Frequency Domain Equalization for Single-Carrier Broadband Wireless Systems, David Falconer, Carleton University, Apr. 2002, IEEE Communications Magazine Apr. 2002.

* cited by examiner

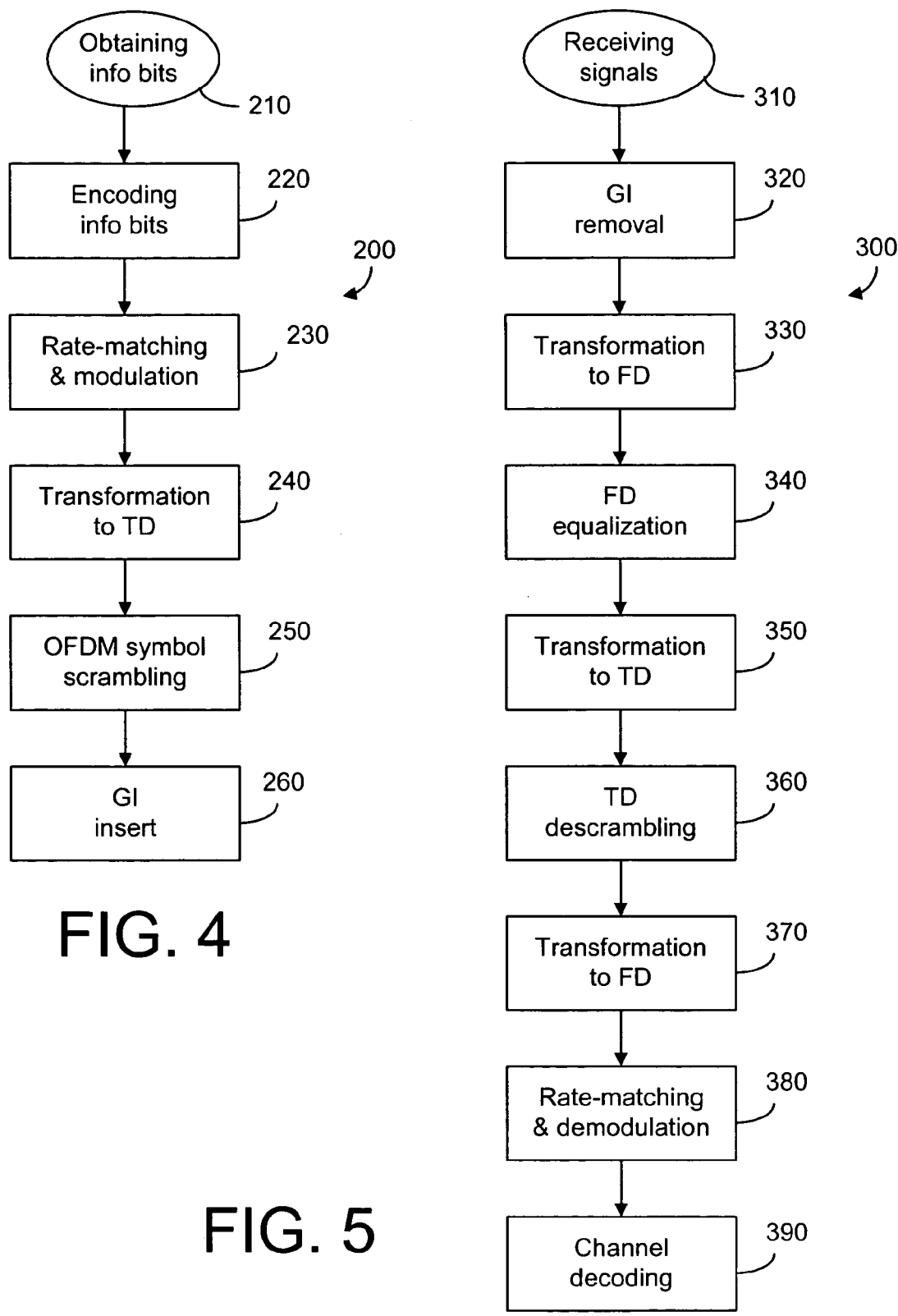

OFDM TRANSCEIVER STRUCTURE WITH TIME-DOMAIN SCRAMBLING

FIELD OF THE INVENTION

The present invention relates generally to a telecommunications system and, more particularly, to wireless multicarrier communications such as an orthogonal frequency division multiplexing system, or multicarrier code division multiplexing access system (MC-CDMA).

BACKGROUND OF THE INVENTION

Orthogonal frequency-division multiplexing (OFDM) offers the advantages of improved downlink system capacity, coverage and data rates for packet data services with high spectral efficiency due to a nearly rectangular spectrum occupancy, and low-cost implementation using the Fast Fourier Transform (FFT). OFDM has been exploited for wideband data communications over mobile radio channels, high bit rate digital subscriber lines (HDSLs), asymmetric digital subscriber lines (ADSLs), and digital broadcasting. OFDM partitions the entire bandwidth into parallel independent subcarriers to transmit parallel data streams. The relative longer symbol duration and guard interval provide great immunity to intersymbol interference (ISI). Recently it received considerable attention as an air interface for evolution of UMTS mobile radio systems in 3GPP standardization forum.

A conventional OFDM transceiver is shown in FIG. 1. As shown in FIG. 1, the information bits are encoded, rate-matched and modulated based on adaptive modulation and coding (AMC) set. Then the signal is processed by the N-point IFFT such as $$b(n) = IFFT\{B(k)\} = \sum_{k=0}^{N-1} B(k)\exp(j2\pi kn/N) \quad (1)$$

$$n = 0, 1, 2, \ldots, N-1$$

where B(k) is the data sequence of length N. Then the output of IFFT is converted from parallel to serial (P/S), and inserted by the redundancy in the form of a guard interval (GI) of length greater than maximum delay spread such as $$x(n) = \begin{cases} b(N+n), & n = -G, -G+1, \ldots, -1 \\ b(n), & n = 0, 1, 2, \ldots, N-1 \end{cases} \quad (2)$$

where x(n) is the transmitted signals, G is the GI length. Finally, GI-added IFFT output x(n) is up-converted at the carrier frequency and transmitted over the frequency-selective fading channel with additive white Gaussian noise (AWGN).

The received signal at the UE is given by $$r(t) = h(t) \otimes x(t) + n(t) \quad (3)$$

where $\otimes$ denotes the convolution operation, $$h(t) = \sum_{l}^{L} a_l(t)\delta(t - \tau_l) \quad (4)$$

is the channel impulse response in time domain, L is the number of paths, $a_l(t)$ is the complex channel coefficient at the $l^{th}$ path, $\tau_l$ is the tap delay, $\delta(t)$ is the delta function, n(t) is the additive white Gaussian noise. The GI is removed from the received signal and the GI-removed signal is processed by FFT as follows $$y(n) = r(n+G), \quad n = 0, 1, 2, \ldots, N-1 \quad (5)$$

$$Y(k) = FFT\{y(n)\} = \frac{1}{N}\sum_{n=0}^{N-1} y(n)\exp(-j2\pi kn/N) \quad (6)$$

$$k = 0, 1, 2, \ldots, N-1$$

If the bandwidth of each subcarrier is much less than the channel coherence bandwidth, a frequency flat channel model can be assumed at each subcarrier so that only a one-tap equalizer is needed for each subcarrier at the receiver. With the channel estimates in frequency domain H(k), the received signal can be equalized by zero-forcing detector such as $$\hat{B}(k) = (H(k))^{-1} Y(k) = \frac{H^*(k)Y(k)}{|H(k)|^2} \quad k = 0, 1, 2, \ldots, N-1 \quad (7)$$

or in minimum mean square error (MMSE) criteria such as $$\hat{B}(k) = \frac{H^*(k)Y(k)}{|H(k)|^2 + \sigma^2} \quad k = 0, 1, 2, \ldots, N-1 \quad (8)$$

where ( )* and $||^2$ denote the complex conjugate operation and power respectively, $\sigma^2$ is the noise variance. Then the equalized signal is demodulated, rate matched and decoded correspondingly.

The corresponding discrete-time received signal with GI removal is $$y = THGF^{-1}b + n \quad (9)$$

$$= XF^{-1}b + n$$

where y is the received signal vector, T is the truncating matrix, H is the matrix with channel impulse response, G is the matrix for GI inserting, $F^{-1}$ is the IFFT matrix, b is the vector of transmitted symbols and n is the noise vector. Assuming the GI length is greater than maximum delay spread, x=THG is the circular square matrix and can be modeled as $$X = F^{-1}H_f F \quad (10)$$

where $H_f$ is the diagonal matrix with channel impulse response in frequency domain, and F is the FFT matrix. Then the received signal with GI removal in Eq. 9 can be simplified into $$y = F^{-1}H_f b + n \quad (11)$$

The transmitted signal can be detected by FFT and one-tap zero-forcing channel equalizer such as $$\hat{b} = (H_f)^{-1} F y \quad (12)$$

or in MMSE such as $$\hat{b} = \frac{(H_f)^* F y}{|H_f|^2 + \sigma^2} \quad (13)$$

Frequency hopping has been proposed for reuse-one OFDM systems, which enables a full frequency reuse across the neighboring cells, provides frequency diversity by interleaving and spreading the transmitted subcarriers over the whole bandwidth, and averages the intercell interference as well. However, frequency hopping makes the reuse-one OFDM system not as efficient in spectrum efficiency as in WCDMA. The subset of subcarriers are used by the specific UE implies for lower peak data rate. Additionally, it is also a challenge for radio network control for resource and subcarrier allocation. OFDM channel mapping has been proposed without requiring resource planning on network level by modeling the time-frequency pattern using normalized a periodic Hamming auto-correlation function. However, it is not a spectrum effective scheme either.

Selective scrambling in frequency domain has been proposed for OFDM to reduce the peak to average power ratio (PAR) (see Yang et al. "Peak-to-Average Power Control in OFDM Using Standard Arrays of Linear Block Codes" *IEEE Commun. Letters*, vol. 7, No. 4, pp. 174-176, April 2003; Eetvelt et al. "Peak-to-Average Power Reduction for OFDM Schemes by Selective Scrambling", *IEE Electronics Letters*, Vol. 32, No. 21, pp. 1963-1964, October 1996). A cell specific code has been proposed to scramble the signals in frequency domain for fast cell search in orthogonal frequency and code division multiplexing (OFCDM) and multicarrier CDMA systems (see Tanno et al. "Three-Step Fast Cell Search Algorithm Utilizing Common Pilot Channel for OFDM Broadband Packet Wireless Access" *IEE VTC-Fall*, Vol. 3, pp. 24-28, 2002; Hanada et al. "Three-Step Cell Search Algorithm for Broadband Multi-carrier CDMA Packet Wireless Access", *IEEE PIMRC*, Vol. 2, pp. G32-37, 2001). A pseudo-noise (PN) code scrambling in time domain has been also applied for user separation in OFDM-CDMA system (see Kim et al., "An OFDM-CDMA Scheme Using Orthogonal Code Multiplexing and Its Parallel Interference Cancellation Receiver", *IEEE ISSSTA*, pp. 368-372, Czech Rep. September 2002). However, the scrambling in frequency domain cannot suppress the interference impact induced by neighboring cells for reuse-one OFDM systems.

SUMMARY OF THE INVENTION

It is an object of the present invention to suppress the interference impact induced by neighboring cells and to improve the frequency diversity. In OFDM systems where frequency re-use factor as one is considered, all the frequencies or subcarriers are used in every sector of adjacent cells. In such a frequency reuse-one OFDM systems there will be very strong intercell interference particularly for the user equipment (UE) at the cell edge, which might result in a relatively poor performance. The present invention provides a method and device for OFDM signal processing, wherein time-domain scrambling is used to suppress the intercell interference and improve the frequency diversity. The present invention improves the spectrum efficiency and the overall OFDM system throughput especially in wireless cellular environments, and achieves the same peak data rate of WCDMA systems.

Thus, the first aspect of the present invention provides a method of frequency division multiple access communications wherein a signal indicative of a plurality of information bits are encoded and modulated into a plurality of coded symbols, and the coded symbols are transformed into a further signal in time-domain. The method comprises:

scrambling the coded symbols in the time-domain for providing a signal stream indicative of scrambled coded symbols; and inserting the signal stream by redundancy at a guard interval for providing a data stream with guard interval for transmission.

According to the present invention, the data stream is received in a receiver and wherein the received data stream is guard interval removed, converted into frequency-domain and equalized for providing an equalized frequency-domain signal. The method further comprises:

converting the equalized frequency-domain signal into time-domain for providing an equalized time-domain signal;

descrambling the equalized time-domain signal for providing a time domain descrambled signal; and converting the time-domain descrambled signal into a further descrambled signal in the frequency domain.

According to the present invention, the coded symbols are transformed into the further signal in time domain by an inverse fast Fourier transform (IFFT) operation; the received data stream is guard interval removed and then converted into the frequency domain by a fast Fourier transform (FFT) operation; the equalized frequency-domain signal is converted into the time domain by an IFFT operation; and the time-domain descrambled signal is converted into the further descrambled signal in the frequency domain by an FFT operation.

According to the present invention, the method further comprises:

up-converting the data stream with guard interval at a carrier frequency for transmission over a frequency selective fading channel.

The second aspect of the present invention provides a transmitter for use in frequency division multiple access communications wherein a signal indicative of a plurality of information bits are encoded and modulated into a plurality of coded symbols and the coded symbols are transformed into a further signal in time-domain. The transmitter comprises:

a scrambling module, responsive to the further signal, for providing a signal stream indicative of scrambled coded symbols; and an inserting module, responsive to the signal stream, for inserting the signal stream by redundancy at a guard interval for providing a data stream with guard interval for transmission.

According to the present invention, the guard interval has a length which is greater than maximum delay spread to resist inter-symbol interference due to the frequency-selective channel.

The third aspect of the present invention provides a receiver for use in a frequency division multiple access communications system, the system having a transmitter, the transmitter comprising:

means for encoding and modulating a signal indicative of a plurality of information bits into a plurality coded symbols for providing a further signal in time domain indicative of the plurality of coded symbols, means for scrambling a further signal for providing a scrambled signal, means for inserting the scrambled signal by redundancy at a guard interval for providing a guard-interval signal, and means for transmitting a data stream indicative of the guard-interval signal, wherein the data stream received in the receiver is guard-interval removed, converted into frequency-domain and equalized for providing an equalized frequency-domain signal. The receiver comprises:

a first module for converting the equalized frequency domain signal for providing an equalized time-domain signal;

a second module for descrambling the equalized time-domain signal for providing a time-domain descrambled signal; and a third module for converting the time-domain descrambled signal into a further descrambled signal in the frequency domain.

According to the present invention, the data stream received in the receiver is guard-interval removed, converted into the frequency-domain and the equalized for providing an equalized frequency-domain signal by a one-tap channel equalizer.

The fourth aspect of the present invention provides a frequency division multiple access communications system, which comprises:

a transmitter including:
a first module for encoding and modulating a signal indicative of a plurality of information bits into a plurality coded symbols for providing a further signal indicative of the plurality of coded symbols;
a second module for converting the coded symbols into frequency-division multiplexed symbols in time-domain;
a third module for scrambling the frequency-division multiplexed symbols in time domain for providing a scrambled signal,
a fourth module for inserting the scrambled signal by redundancy at a guard interval for providing a guard-interval signal, and
a fifth for transmitting a data stream indicative of the guard-interval signal; and
a receiver for receiving a data stream, the receiver including:
a first module for removing the guard-interval in the data stream for providing a guard-interval removed signal;
a second module for converting the guard-interval removed signal into a frequency-domain signal;
a third module for equalizing the frequency-domain signal for providing an equalized frequency-domain signal;
a fourth module for converting the equalized frequency-domain signal into an equalized time-domain signal;
a fifth module for descrambling the equalized time-domain signal for providing a time-domain descrambled signal; and
a sixth module for converting the time-domain descrambled signal into a further descramble signal in frequency domain.

According to the present invention, the communications system comprises a wireless local area network (WLAN), a cellular orthogonal frequency division multiplexing (OFDM) system, a multi-carrier OFDM system, a high bitrate digital subscriber line (HDSL) system, an asymmetric digital subscriber line (ADSL) system, and a digital broadcasting system.

The fifth aspect of the present invention provides a component in a frequency division multiple access communications system, which comprises:

an antenna, and
a transceiver operatively connected to the antenna, the transceiver comprising:
a transmitter including:
a first module for encoding and modulating a signal indicative of a plurality of information bits into a plurality coded symbols for providing a further signal indicative of the plurality of coded symbols,
a second module for converting the coded symbols into frequency-division multiplexed symbols in time-domain;
a third module for scrambling the frequency-division multiplexed symbols in time domain for providing a scrambled signal,
a fourth module for inserting the scrambled signal by redundancy at a guard interval for providing a guard-interval signal, and
a fifth for transmitting a data stream indicative of the guard-interval signal;
and
a receiver for receiving a data stream via the antenna, the receiver including:
a first module for removing the guard-interval in the data stream for providing a guard-interval removed signal;
a second module for converting the guard-interval removed signal into a frequency-domain signal;
a third module for equalizing the frequency-domain signal for providing an equalized frequency-domain signal;
a fourth module for converting the equalized frequency-domain signal into an equalized time-domain signal;
a fifth module for descrambling the equalized time-domain signal for providing a time-domain descrambled signal; and
a sixth module for converting the time-domain descrambled signal into a further descramble signal in frequency domain.

According to the present invention, the component comprises a user equipment (UE).

According to the present invention, the component comprises a mobile terminal.

The present invention will be apparent upon reading the description taken in conjunction with FIGS. 2-7.

BRIEF DESCRIPTION OF THE DRAWINGS

FIG. 4 is a flowchart illustrating the method of OFDM processing at the transmitter side, according to the present invention.

FIG. 5 is a flowchart illustrating the method of OFDM processing at the receiver side, according to the present invention.

DETAILED DESCRIPTION OF THE INVENTION

The present invention performs scrambling of the conventional OFDM symbols with a long scrambling sequence after the IFFT operation and prior to the GI insert in a transmitter. The scrambling in the time domain for reuse-one OFDM downlink systems is used to suppress the intercell interference and improve the frequency diversity. The present invention makes OFDM systems with the same spectrum efficiency and peak data rate as in WCDMA system. Accordingly, the conventional OFDM symbols after inverse fast Fourier transform (IFFT) operation at the transmitter side are scrambled in time domain for the purpose of cell search, whitening the intercell interference in reuse-one OFDM systems and frequency diversity. Then the guard interval (GI) is inserted, up-converted at the carrier frequency, and transmitted.

After frequency-domain channel equalization at the receiver side, the equalized signal is transformed into time-domain by IFFT function and descrambled correspondingly. Then the descrambled signal in time domain is transformed back into frequency-domain, followed by the same processing steps such as demodulation, rate matching and channel decoding as in the conventional OFDM receiver structure.

Figure 2:
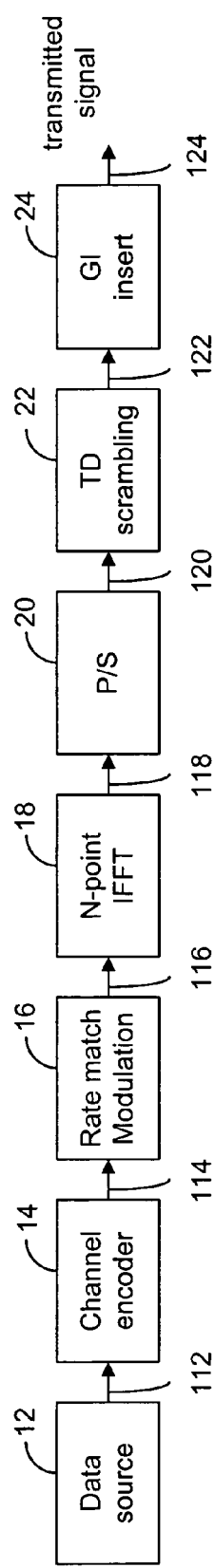
FIG. 2 is a block diagram showing an embodiment of the OFDM transmitter of the present invention.
Figure 3:
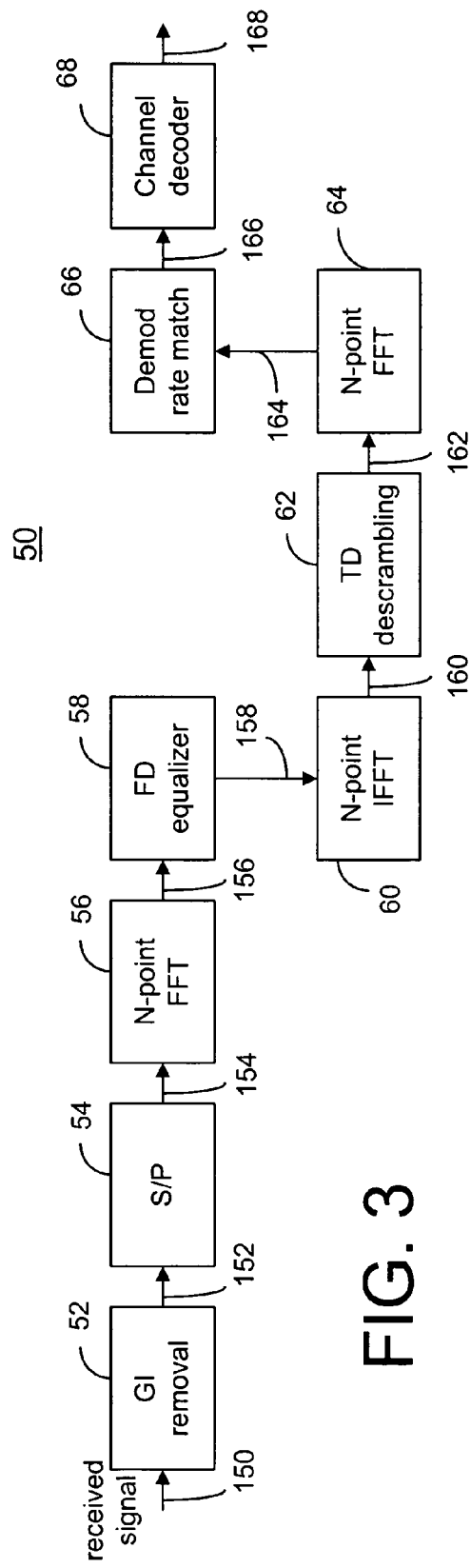
FIG. 3 is a block diagram showing an embodiment of the OFDM receiver of the present invention.

An embodiment of the OFDM transmitter with scrambling in time domain, according to the present invention, is shown in FIG. 2. The OFDM receiver, according to the present invention, is shown in FIG. 3.

In the OFDM transmitter 10 as shown in FIG. 2, the information bits 112 provided by the data source block 12 is encoded by the channel encoder 14 into coded bits 114. After being rate-matched and modulated by the modulation block 16, the coded bits become code symbols 116 or B(k). The IFFT output 118 from the N-Point IFFT block 18 is converted by a parallel-to-serial block 20. According to the present invention, the conventional symbols 120 or b(n) after the IFFT operation in Eq. 1 are scrambled in time domain by the corresponding long scrambling sequence such as:

$$\tilde{b}(n) = c_i(n) \times b(n) \quad n=0,1,2,\ldots,N-1 \qquad (14)$$

where $c_i(n)$ is the part of the long scrambling sequence corresponding to $i^{th}$ OFDM symbol. The scrambled signal $\tilde{b}(n)$, or the scrambled OFDM symbols 122 is GI (guard interval) inserted at block 24 as in Eq. 2 and then the transmit signal 124 is transmitted.

Similar to the conventional OFDM receiver, the received signal 150 received by the OFDM receiver 50, according to the present invention, is processed by block 52 for GI removal. The output 152 is converted by a serial-to-parallel block 54. The time-domain received signal 154 is transformed into frequency-domain (TD) by FFT operation, as in Eq. 6, by the N-Point FFT 56 into frequency-domain (FD) signal 156. The FD signal Y(k) is equalized by block 58 as in Eq. 7. The equalized signal 158 is transformed into time domain by IFFT operation 60 as in Eq. 1 into equalized TD signal 160, or $\tilde{b}(n)$. The time-domain equalized signal 116 is descrambled by the corresponding scrambling code at block 62 such as $$\bar{b}(n) = c^{*}_i(n) \times \tilde{b}(n) \quad n=0,1,2,\ldots,N-1 \qquad (15)$$

Finally the descrambled TD signal 162 is transformed at block 64 back into frequency domain by FFT operation as in Eq. 6. The descrambled FD signal 164 is demodulated and rate-matched at block 66. The output 166 of the demodulation block 66, or the estimate coded bits are then decoded by the channel decoder 66 into estimate information bits 168.

The discrete-time received signal with GI removal in the OFDM transceiver 50 with time-domain scrambling, according to the present invention, can be written as $$y = THGCF^{-1}b + n \qquad (16)$$
$$= XCF^{-1}b + n$$

where C is the diagonal matrix containing long scrambling code. The corresponding simplified received signal with GI removal is $$y = F^{-1}H_fFCF^{-1}b + n \qquad (17)$$

The received signal is then transformed into frequency domain by FFT and equalized by one-tap zero-forcing channel equalizer such as $$d = (H_f)^{-1}Fy \qquad (18)$$
$$= FCF^{-1}b + \tilde{n}$$

Then the equalized signal is transformed into time-domain by IFFT, descrambled by the corresponding scrambling code, transformed back into frequency domain as $$\bar{b} = FC^{-1}F^{-1}d \qquad (19)$$

Figure 1:
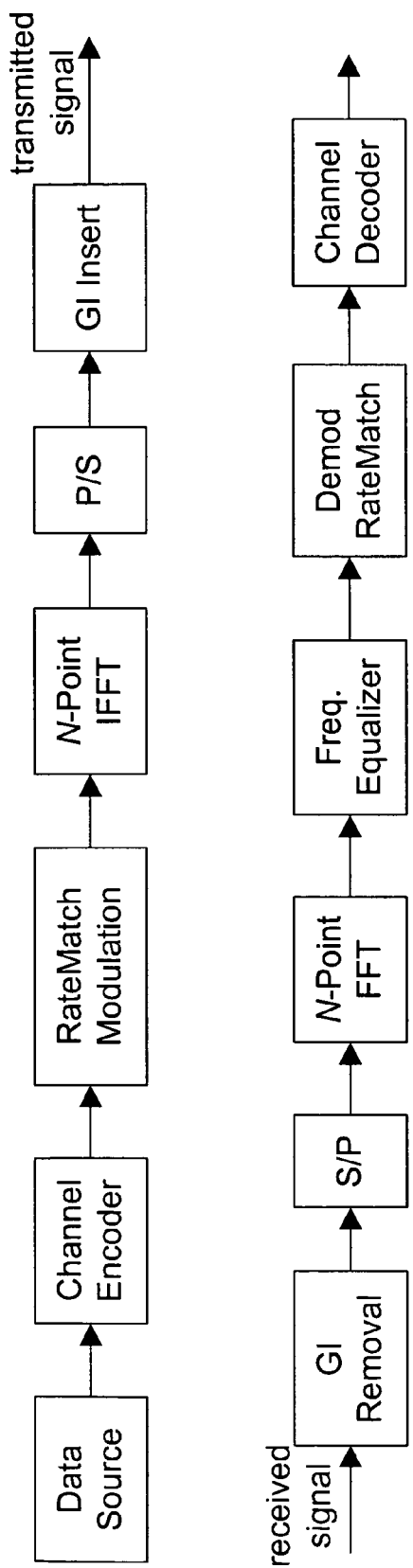
FIG. 1 is a block diagram showing a conventional OFDM transceiver.

The additional processing required by the scheme, according to the present invention, is carried out by block 22 in FIG. 2 at the transmitter side and blocks 60, 62 and 64 in FIG. 3 at the receiver side. The scrambling and descrambling processing can be easily implemented by N-sized summations. Comparing to the conventional OFDM as shown in FIG. 1, the time-domain scrambling of the present invention requires additional two FFT operations (blocks 60 and 64).

In sum, the time-domain scrambling, according to the present invention, is carried out after IFFT operation and prior to GI insert at the transmitter side. After the conventional frequency-domain channel equalization at the receiver side, the equalized signal is transformed into time-domain for descrambling and transformed back into frequency domain. The descrambled FD signal is then, demodulated, rate-matched and decoded. Using the long scrambling in time domain could improve the estimates of channel tap delay for frame synchronization, the reuse-one OFDM cellular overall system throughput by whitening the strong intercell interference, and fast cell search, and so forth.

The method of signal processing signals in an OFDM tranceiver is further illustrated in FIG. 4 and FIG. 5. As shown in the flowchart 200, after information bits in the receiver are provided at step 210 by a data source, they are encoded at step 220 into coded information bits. The coded information bits are rate-matched and modulated at step 230 and then transformed into time-domain OFDM symbols at step 240. A time domain scrambling step 250 is carried out to provide scrambled OFDM symbols, which are GI inserted at step 260 and further up-converted at the carrier frequency for transmission.

As shown in the flowchart 300, after signals are received at step 310, they are down-converted and then the GI is removed from the signals at step 320. The GI removed signals are transformed into frequency domain at step 330 and equalized at step 340, by a zero-forcing detector, for example. The equalized frequency-domain signals are transformed into time domain at step 350 so that time-domain descrambling can be carried out at step 360. The time-domain descrambled signals are transformed back to frequency domain at step 370 before they are rate-matched and demodulated at step 380. The outcome of step 380 is the estimates coded bits, which are decoded at step 390 into estimated information bits.

While the present invention requires two additional FFT operations in the receiver side, the advantages of the present invention include:

The spectrum efficiency and the peak data rate of an OFDM system can be as high as those of a WCDMA system;

System throughput in either single-cell or multi-cell environments can be considerably improved by frequency diversity and by whitening the strong intercell interference; and improvement in estimates of channel tap delays for frame synchronization and fast cell search can be realized by long scramble code in time domain.

The present invention is applicable in any kind of wireless OFDM communications, including, but not limited to, WLAN, cellular OFDM and multicarrier-CDMA for pico-, micro- and macro-cell environments) transceivers. The present invention can be used for wideband data communications over mobile radio channels, high bitrate digital subscriber lines (HDSLs), asymmetric digital subscriber lines (ADLs) and digital broadcasting.

Figure 6:
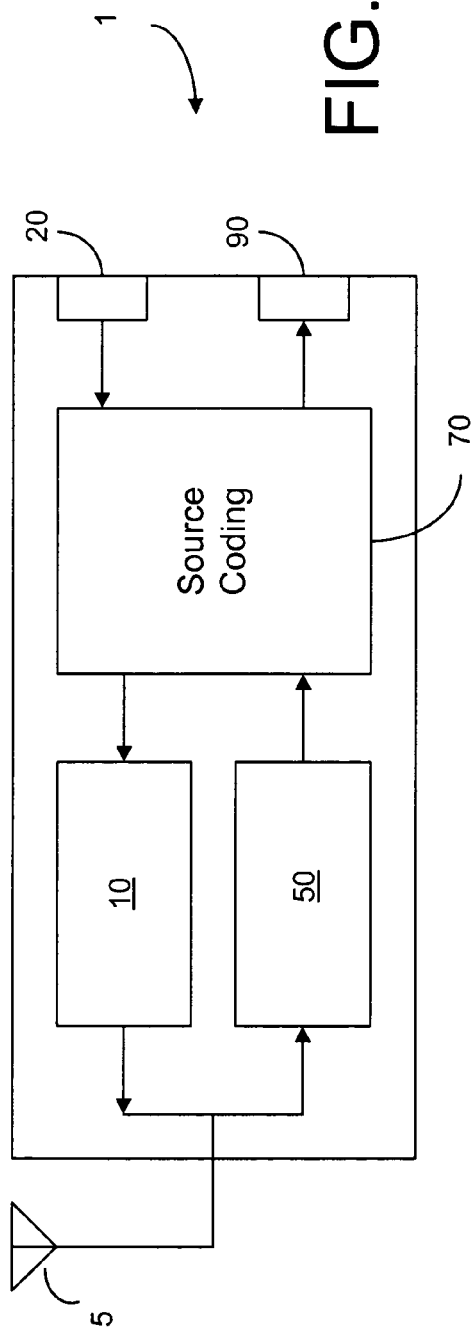
FIG. 6 is a schematic representation illustrating an electronic device having an OFDM transceiver, according to the present invention.

FIG. 6 illustrates a typical communication device that uses the transceiver, according to the present invention. As shown, the communication device 1 comprises an antenna 5 to be shared with the transmitter 10 and the receiver 50, according to the present invention. The transmitter 100 and the receiver 200 are linked to a microphone 20 and a speaker 90 via a source coding module 70 where the sound signal from the microphone is encoded and where the received sound signal is decoded. The communication device 1 can be a mobile phone, for example.

Figure 7:
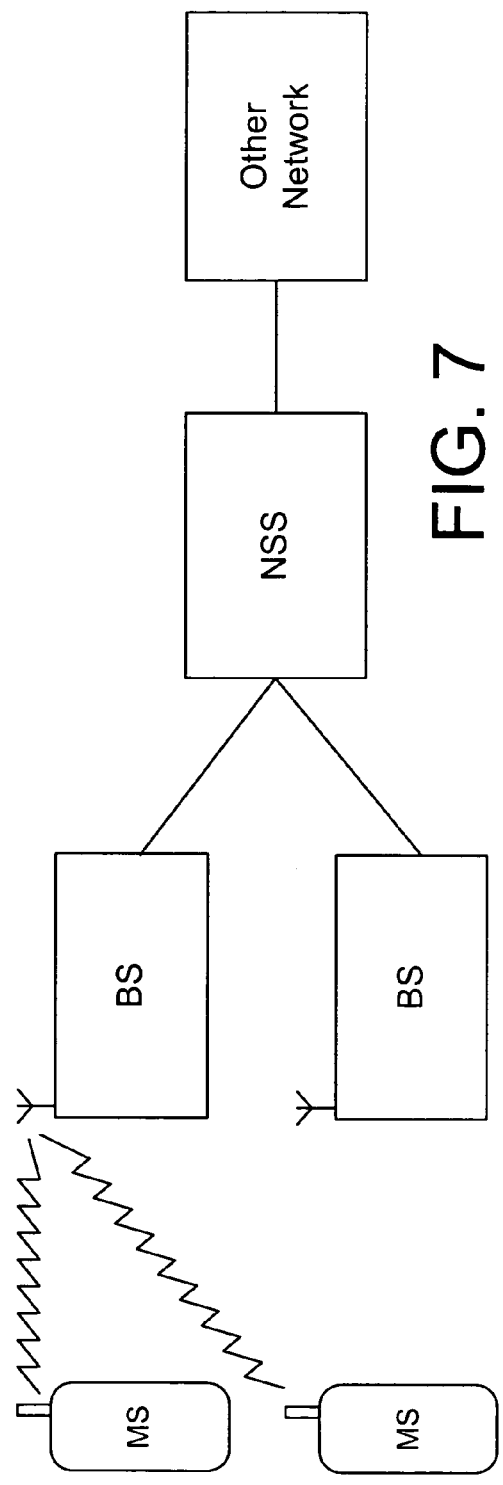
FIG. 7 is a schematic representation illustrating a communications network having communication components that use the OFDM transmitter and receiver, according to the present invention.

FIG. 7 is a schematic representation of a communication network that can be used for cell OFDM communications, according to the present invention. As shown in the figure, the network comprises a plurality of base stations (BS) connected to a switching sub-station (NSS), which may also be linked to other network. The network further comprises a plurality of mobile stations (MS) capable of communicating with the base stations. The mobile station can be a mobile phone, which is usually referred to as a complete terminal. The mobile station can also be a module for terminal without a display, keyboard, battery, cover etc. The transmitter 10 and the receiver 50 can be located in the base station, the switching sub-station or in another network.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of frequency division multiple access communications wherein a signal indicative of a plurality of information bits are encoded and modulated into a plurality of coded symbols, and the coded symbols are transformed into a further signal in time-domain, said method comprising:

scrambling the time-domain coded symbols to provide a scrambled coded signal; and appending the scrambled coded signal as redundancy data in a form a guard interval to provide a data stream with the guard interval for transmission.

2. The method of claim 1, wherein the data stream is received in a receiver and wherein the received data stream is guard interval removed, converted into frequency-domain and equalized to provide an equalized frequency-domain signal, said method further comprising:

converting the equalized frequency-domain signal into a time-domain signal thereby providing an equalized time-domain signal;

descrambling the equalized time-domain signal to provide a descrambled time domain signal; and converting the descrambled time-domain signal into a further descrambled signal in the frequency domain.

3. The method of claim 2, wherein the received data stream is converted into the frequency domain by a fast Fourier transform (FFT) operation.

4. The method of claim 2, wherein the equalized frequency-domain signal is converted into the time domain by an inverse fast Fourier transform (IFFT) operation, and the descrambled time-domain signal is converted into the further descrambled signal in the frequency domain by a fast Fourier transform (FFT) operation.

5. The method of claim 1, wherein the coded symbols are transformed into the further signal in the time domain by an inverse fast Fourier transform (IFFT) operation.

6. The method of claim 1, further comprising up-converting the data stream with the guard interval at a carrier frequency for transmission over a frequency selective fading channel.

7. A transmitter for use in frequency division multiple access communications wherein a signal indicative of a plurality of information bits are encoded and modulated into a plurality of coded symbols and the coded symbols are transformed into a further signal in time-domain, said transmitter comprising:

a scrambling module, responsive to the further signal, for providing a signal stream indicative of scrambled time-domain coded symbols; and an appending module, responsive to the signal stream, for appending the scrambled coded symbols as redundancy data in a form of a guard interval to provide a data stream with the guard interval for transmission.

8. The transmitter of claim 7, wherein the guard interval has a length which is greater than a maximum delay spread.

9. A receiver for use in a frequency division multiple access communications system, the system having a transmitter which comprises:

means for encoding and modulating a signal indicative of a plurality of information bits into a plurality coded symbols;

means for providing a further signal in time domain indicative of the plurality of coded symbols;

means for scrambling the further signal to provide a scrambled signal;

means for appending the scrambled signal as redundancy data in a form of a guard interval to provide a data stream with the guard interval for transmission; and means for transmitting the data stream with the guard-interval wherein the data stream received in the receiver is guard-interval removed, converted into frequency-domain and equalized to provide an equalized frequency-domain signal, said receiver comprising:

a first module for converting the equalized frequency-domain signal to an equalized time-domain signal;

a second module for descrambling the equalized time-domain signal to provide a descrambled time-domain signal; and a third module for converting the descrambled time-domain signal into a further descrambled signal in the frequency domain.

10. The receiver of claim 9, wherein the data stream received in the receiver is guard-interval removed, converted into the frequency-domain and then equalized by a one-tap channel equalizer to provide the equalized frequency-domain signal.

11. The receiver of claim 9, wherein the first module comprises an inverse Fourier transform operation for converting the equalized frequency-domain signal to the equalized time-domain signal, and the third module comprises a Fourier transform operation for converting the deserambled time-domain signal to the further descrambled signal in the frequency domain.

12. A frequency division multiple access communications system, comprising:
  a transmitter including:
    a first module for encoding and modulating a signal indicative of a plurality of information bits into a plurality coded symbols to provide a further signal indicative of the plurality of coded symbols;
    a second module for converting the coded symbols into frequency-division multiplexed symbols in time-domain;
    a third module for scrambling the frequency-division multiplexed symbols in time domain to provide a scrambled signal,
    a fourth module for appending the scrambled signal as redundancy data in a form of a guard interval to provide a data stream with the guard interval for transmission, and
    a fifth module for transmitting the data stream with the guard-interval signal; and
  a receiver for receiving a data stream, the receiver including:
    a first module for removing the guard interval in the data stream to provide a guard-interval removed signal;
    a second module for converting the guard-interval removed signal into a frequency-domain signal;
    a third module for equalizing the frequency-domain signal to provide an equalized frequency-domain signal;
    a fourth module for converting the equalized frequency-domain signal into an equalized time-domain signal;
    a fifth module for descrambling the equalized time-domain signal to provide a descrambled time-domain signal; and
    a sixth module for converting the descrambled time-domain signal into a further descrambled signal in frequency domain.

13. The communications system of claim 12, comprising a wireless local area network (WLAN).

14. The communications system of claim 12, comprising a cellular orthogonal frequency division multiplexing (OFDM) system.

15. The communications system of claim 12, comprising a multi-carrier code division multiple access (CDMA) system.

16. The communications system of claim 12, comprising a digital subscriber line (DSL) system.

17. The communication system of claim 12, comprising a digital broadcasting system.

18. A component in a frequency division multiple access communications system, comprising:
  a transceiver operatively connected to an antenna, the transceiver comprising:
    a transmitter including:
      a first module for encoding and modulating a signal indicative of a plurality of information bits into a plurality coded symbols to provide a further signal indicative of the plurality of coded symbols,
      a second module for converting the coded symbols into frequency-division multiplexed symbols in time-domain;
      a third module for scrambling the frequency-division multiplexed symbols in a time domain to provide a scrambled signal,
      a fourth module for appending the scrambled signal as redundancy data in a form of a guard interval to provide a data stream with the guard interval for transmission, and
      a fifth module for transmitting the data stream with the guard-interval signal; and
    a receiver for receiving a data stream via the antenna, the receiver including:
      a first module for removing the guard interval in the data stream to provide a guard-interval removed signal;
      a second module for converting the guard-interval removed signal into a frequency-domain signal;
      a third module for equalizing the frequency-domain signal to provide an equalized frequency-domain signal;
      a fourth module for converting the equalized frequency-domain signal into an equalized time-domain signal;
      a fifth module for descrambling the equalized time-domain signal to provide a descrambled time-domain signal; and
      a sixth module for converting the descrambled time-domain signal into a further descrambled signal in a frequency domain.

19. The component of claim 18, comprising a user equipment (UE).

20. The component of claim 18, comprising a mobile terminal.

* * * * *

UNITED STATES PATENT AND TRADEMARK OFFICE
CERTIFICATE OF CORRECTION

PATENT NO. : 7,564,906 B2 Page 1 of 1
APPLICATION NO. : 10/781041
DATED : July 21, 2009
INVENTOR(S) : Wang et al.

It is certified that error appears in the above-identified patent and that said Letters Patent is hereby corrected as shown below:

In column 10, line 62, claim 9, line 15 after "interval" --signal,-- should be inserted.

Signed and Sealed this

Thirteenth Day of October, 2009

David J. Kappos
*Director of the United States Patent and Trademark Office*